(12) United States Patent
Charafeddine et al.

(10) Patent No.: US 8,496,204 B1
(45) Date of Patent: Jul. 30, 2013

(54) METHOD AND SYSTEM FOR MINIMIZING AXIAL BACKLASH IN A DUAL LOAD PATH FAIL-SAFE AIRCRAFT ACTUATOR SYSTEM

(75) Inventors: Abbas M. Charafeddine, Mission Viejo, CA (US); Douglas M. Chapman, Santa Ana, CA (US); Robert S. Barlow, Irvine, CA (US); Guy J. Duplain, Irvine, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 127 days.

(21) Appl. No.: 13/177,496

(22) Filed: Jul. 6, 2011

(51) Int. Cl.
*B64C 13/42* (2006.01)

(52) U.S. Cl.
USPC .................................. 244/99.4; 244/99.9

(58) Field of Classification Search
USPC ............... 244/45 R, 46, 48, 99.2, 99.3, 99.4, 244/99.9, 99.14
See application file for complete search history.

(56) References Cited

U.S. PATENT DOCUMENTS

| | | | |
|---|---|---|---|
| 3,695,096 A | 10/1972 | Kutsay | |
| 4,149,430 A * | 4/1979 | F'Geppert | 74/89.39 |
| 4,159,444 A | 6/1979 | Bartlett et al. | |
| 4,594,714 A | 6/1986 | Fischer et al. | |
| 4,745,815 A * | 5/1988 | Klopfenstein | 74/89.25 |
| RE32,746 E | 9/1988 | Nelson | |
| 4,782,706 A | 11/1988 | Kister | |
| 5,114,096 A | 5/1992 | Wernicke | |
| 5,719,566 A | 2/1998 | Readman et al. | |
| 6,011,482 A | 1/2000 | Banks | |
| 6,140,942 A | 10/2000 | Bragg | |
| 6,239,713 B1 | 5/2001 | Harvey | |
| 6,389,915 B1 | 5/2002 | Wngett | |
| 6,622,972 B2 | 9/2003 | Urnes et al. | |
| 6,636,009 B2 | 10/2003 | Walter | |
| 6,672,540 B1 | 1/2004 | Shaheen | |
| 7,299,702 B2 | 11/2007 | Gibert | |
| 2006/0170535 A1 | 8/2006 | Watters | |
| 2009/0289145 A1 * | 11/2009 | Behar et al. | 244/99.4 |

* cited by examiner

*Primary Examiner* — Timothy D Collins
*Assistant Examiner* — Brian M O'Hara
(74) *Attorney, Agent, or Firm* — Donna P. Suchy; Daniel M. Barbieri

(57) ABSTRACT

The actuator locking mechanism is a bi-directional secondary load path lock that operates under both compression and tension loads via a radial locking wedge and axial slide lock system. This locking mechanism is designed to effectively protect against structural disconnect after a primary load path failure occurs and to minimize the axial play in the engaged secondary load path. To avoid the dormancy of such a failure, the activated mechanism jams/stalls the actuator drive thereby alerting the aircrew and the maintenance crew of the fault condition and allowing safe continued flight and landing. This locking mechanism is impervious to relative deflection between the primary and secondary load path such that under a non-failed condition, the mechanism will not jam. A jam only occurs when axial displacement (tension or compression direction) is greater than a predetermined relative deflection. This axial displacement is eliminated by the slide locking system minimizing the axial play. The makeup of this radial locking design also features a cageless roller implementation which captures the rollers within the features of the V-shaped ramp design.

9 Claims, 11 Drawing Sheets

METHOD AND SYSTEM FOR MINIMIZING AXIAL BACKLASH IN A DUAL LOAD PATH FAIL-SAFE AIRCRAFT ACTUATOR SYSTEM

BACKGROUND OF THE INVENTION

1. Field of the Invention

The present invention relates generally to aircraft actuation systems, and more particularly to a dual load path fail-safe actuation system.

2. Description of the Related Art

Modern aircraft have horizontal stabilizers located at the rear tail section of the fuselage or the forward section that are pivotally supported relative to the airplane fuselage to "trim" the aircraft during flight by selective adjustment by the operator or auto-pilot from an internal control unit. The stabilizer actuator is a variable length structural link connecting the horizontal stabilizer control surface to the fuselage structure and used to control the pitch (attitude) of the aircraft during takeoff, cruise and landing phases under different aerodynamic loading conditions. The stabilizer actuator is also used to recover the aircraft during severe aircraft stall situations. In this regard the stabilizer is traditionally pivotally connected to the rear section (or tail section) or forward section of the fuselage.

One common trimmable horizontal stabilizer actuator consists of a primary ball nut assembly connected with an actuating drive gimbal which is pivotally connected to one end of the horizontal stabilizer structure. The ball nut assembly includes a ball nut housing and a rotatable ball screw extending axially and usually vertically through the ball nut housing and a drive gimbal housing. The ball nut housing is connected to the drive gimbal housing by a trunnion segment. The ball screw, in turn, has one end remote from the actuating drive gimbal and is fixed from translation or axial movement by a connection to a second, support gimbal which is pivotally secured to the vertical stabilizer section or the tail section. As the ball screw is rotated, the drive gimbal will be moved in translation relative to it. Thus as the ball screw is rotated in one direction, the leading edge of the horizontal stabilizer is pivoted upward, whereas by rotating the ball screw in the other direction, the leading edge of the horizontal stabilizer is pivoted downward achieving the desired or commanded horizontal stabilizer angle. Rotation of the ball screw is routinely done by a motor (electric or hydraulic, depending on system architecture) and associated gearing which is connected to the second, fixed support gimbal and which is actuated by the operator or pilot by the internal control unit. The connection of the stabilizer actuator to the stabilizer is located within the vertical stabilizer or fuselage tail section and not directly in the air stream.

The horizontal stabilizer movement, as controlled by the operator or auto-pilot, is transmitted by the ball screw through the actuating drive gimbal by way of the primary ball nut assembly which defines a primary load path. The movement has a load with tensile and compressive components as well as a torque component due to the ball screw thread lead. Failures of the primary load path such as caused by the shearing off of the connecting trunnion segment, ball screw disconnect or by the loss of nut ball members from the ball nut assembly can result in the complete loss of control of the horizontal stabilizer. However, stabilizer actuators have frequently been provided with a secondary load path for alternate control of the stabilizer and structural integrity, as well as to meet the required level of safety (failure of single load path actuator has a catastrophic outcome on the aircraft). In such structures, the primary load path is normally controllably actuated by the operator and is thus under load while the secondary load path is normally unactuated and thus unloaded in standby mode. The secondary load path is maintained unloaded during intact primary load path by means of designed in gaps assuring that no load sharing will occur between primary load path components and secondary load path components when the primary load path is axially loaded. In the event of a primary load path failure, the secondary load path is automatically mobilized whereby the stabilizer actuator is jammed in position by means of locks (tie-rod lock or secondary inverted nut lock) and can no longer continue to be controllably actuated by the operator, pilot or auto-pilot to position of the stabilizer. The transition of control to the secondary load path can occur quite rapidly whereby failure of the primary load path is detected by the operator or pilot by means of the jammed actuator.

However, the engaged secondary load path and jammed actuator will have a large axial backlash which in the event of repeated load reversions could enter into a oscillatory mode that will cause rapid deterioration of the secondary load path structural integrity leading to a catastrophic failure condition. The present invention offers a method and solution for allowing sufficiently large gaps between the primary load path and the secondary load path components to prevent load sharing between the two paths during normal operating conditions (when primary load path intact). Yet, when the primary load path has failed and the secondary load path is engaged the present bidirectional locking mechanism will trigger minimizing the axial backlash of the secondary load path to allowable levels assuring the actuator in the secondary load path condition is unaffected by a flutter condition.

SUMMARY OF THE INVENTION

In a broad aspect, the present invention is an actuator system for an aircraft of a type having a primary aircraft structure, a secondary aircraft structure and a control surface positionable relative to the primary and secondary aircraft structures. The load path between the primary and secondary aircraft structure and the control surface defines a dual load path. In this broad aspect the actuator system, includes a) a stationary actuator assembly; b) a ball screw assembly; c) a tie-rod assembly positioned within the ball screw assembly; and, d) a translating actuator assembly.

The stationary actuator assembly, comprises: i) a stationary actuator assembly housing; ii) a gear assembly supported by the stationary actuator assembly housing; iii) at least one motor assembly operatively associated with the gear assembly; and, iv) a stationary primary gimbal assembly mounted to the stationary actuator assembly housing, the stationary primary gimbal assembly being securely connected to a primary aircraft structure.

The ball screw assembly is operatively connected to the gear assembly. The ball screw assembly, includes: i) a ball screw; ii) a ball nut assembly translatable along the ball screw; the ball nut assembly including a plurality of ball circuits, each ball circuit containing a plurality of balls; iii) a secondary inverted thread nut housing in an unloaded standby mode operatively positioned about the ball nut assembly, the secondary inverted thread nut housing having a plurality of radially and axially spaced slots; iv) an extend mechanical stop positioned at an end of the ball screw opposite the stationary actuator assembly; and, v) a retract mechanical stop at an opposite end of the ball screw.

The tie-rod assembly is positioned within the ball screw assembly, the tie-rod assembly being radially locked to the ball screw assembly at extremities thereof. The tie-rod assembly includes: i) a secondary clevis connected to a stationary secondary aircraft structure; ii) a secondary locking element operably connected to the secondary clevis; and, iii) a tie-rod comprising a threaded end including a lock nut. The lock nut is connected to the tie-rod threaded end. A tie-rod secondary load path is defined from the secondary aircraft structure to the secondary clevis, to the locking element to the tie-rod and to the locking nut.

The translating actuator assembly, includes: i) a translating primary gimbal assembly; ii) a translating secondary gimbal assembly; iii) a translating clevis assembly; iv) at least two stationary major keys; v) an axial and radial tension lock assembly; vi) an axial and radial compression lock assembly; and, vii) at least two retaining elements. The translating primary gimbal assembly is operatively connected to the ball screw assembly, defining a translating portion of the primary load path. The translating secondary gimbal assembly is positioned about the translating primary gimbal assembly and securely connected to the control surface. The translating clevis assembly is operatively connected to the secondary inverted thread nut housing and to the translating secondary gimbal assembly. The translating clevis assembly contains a plurality of grooves and associated openings. At least two stationary major keys are mounted between the translating clevis assembly and the secondary inverted thread nut housing (SITNH). The axial and radial tension lock assembly includes at least one tension slide key assembly housed within the translating clevis assembly.

Each tension slide key assembly, includes: a tension slide key; and, at least one spring mounted on the tension slide key and operably connected to the translating clevis assembly. During intact primary load path operation up to the structural integrity load the tension slide key contacts an outer surface of the SITNH in stand-by mode unaffected and unengaged by relative deflections between the primary load path and the secondary load path; and, during failed primary load path operation the tension slide key drops and engages in an associated slot in the SITNH minimizing axial play.

The axial and radial compression lock assembly includes at least one compression slide key assembly housed within the clevis assembly. Each compression slide key assembly, includes: a compression slide key; and, at least one spring mounted on the compression slide key and operably connected to the translating clevis assembly, wherein during intact primary load path operation up to the structural integrity load the compression slide key contacts an outer surface of the SITNH in stand-by mode unaffected and unengaged by relative deflections between the primary load path and the secondary load path; and, during failed primary load path operation the compression slide key drops and engages in an associated slot in the SITNH minimizing axial play.

The at least two retaining elements are securely attached to the translating clevis assembly for providing the operative connection between the translating clevis assembly and the translating secondary gimbal assembly.

A translating portion of the primary load path in compression and in tension directions is defined by the load from the ball screw to the ball nut assembly to the translating primary gimbal assembly to the control surface; wherein only the primary load path is loaded when intact.

A translating portion of the secondary load path in compression direction is defined by the load from the ball screw to the SITNH to the compression slide key and the stationary major keys to the translating clevis assembly to the retaining elements to the translating secondary gimbal assembly to the control surface; wherein the secondary load path is unloaded, in stand-by, when the primary load path is intact in compression.

A translating portion of the secondary load path in tension direction is defined by the load from the ball screw to the SITNH to the tension slide key and the stationary major keys to the translating clevis assembly to the retaining elements to the translating secondary gimbal assembly to the control surface; wherein the secondary load path is unloaded, in stand-by, when the primary load path is intact in tension.

The actuator locking mechanism is a bi-directional secondary lock that operates under both compression and tension loads via a radial locking wedge. This locking mechanism is designed to effectively protect against structural disconnect after a primary load path failure occurs. To avoid the dormancy of such a failure, the activated mechanism jams/stalls the actuator drive thereby alerting aircrew of the fault condition. This locking mechanism is impervious to relative deflection between the primary and secondary load path (i.e. stiffness contributions) such that under a non-failed condition, the mechanism will not jam. A jam only occurs when the axial displacement is greater than a predetermined relative deflection. The makeup of this design also features a cageless roller implementation which captures the rollers within the features of the V-shaped ramp design.

DETAILED DESCRIPTION OF THE INVENTION

Figure 1:
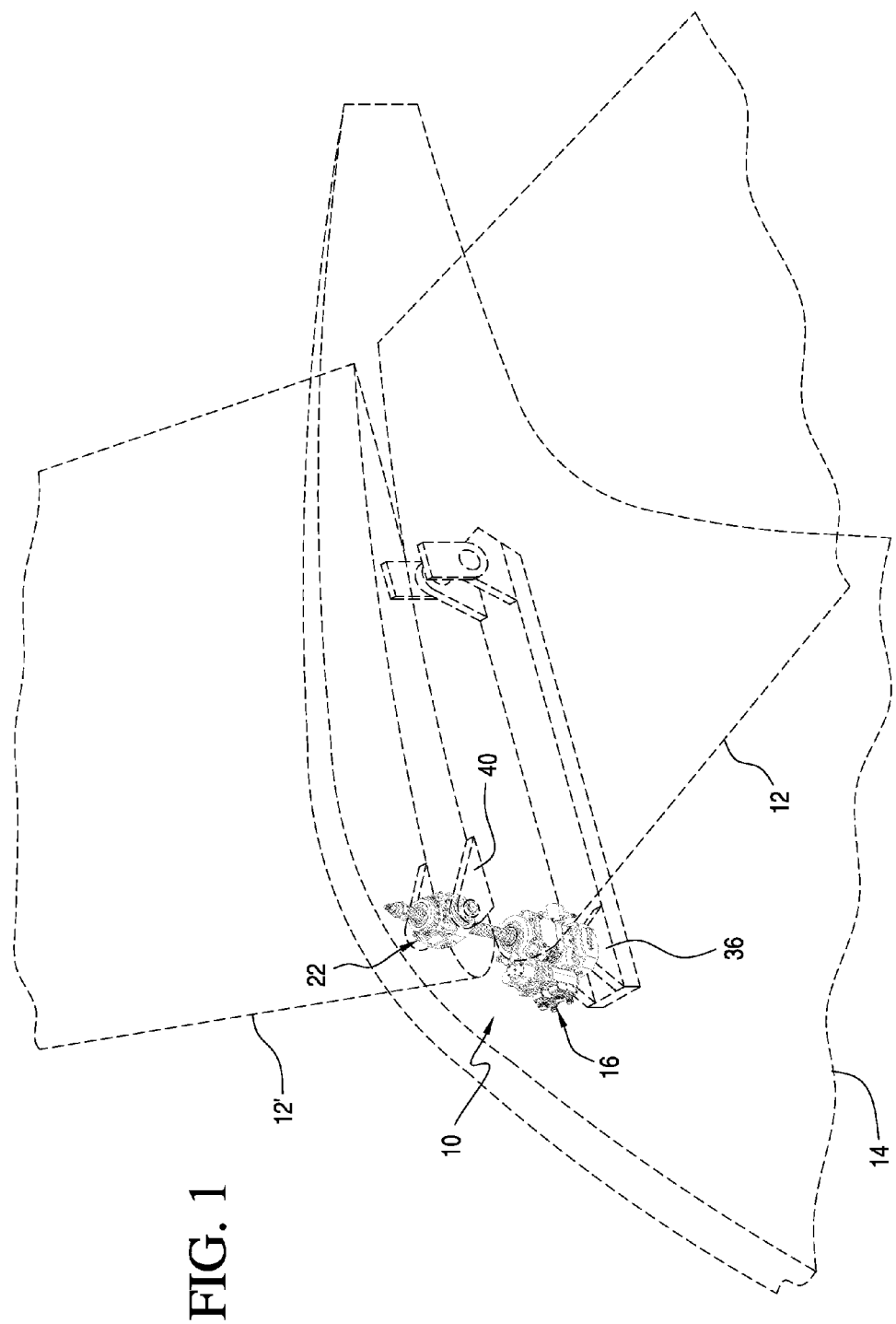
FIG. 1 is a schematic illustration of the actuator system of the present invention, shown affixed to the horizontal stabilizer (T-tail architecture) of a large body aircraft.

Referring now to the drawings and the characters of reference marked thereon, FIG. 1 illustrates the actuator system, designated generally as 10, in accordance with the principles of the present invention, embodied for use with a horizontal stabilizer 12 of an aircraft. The actuator 10 functions along its stroke to facilitate pivoting of the horizontal stabilizer (i.e. control surface) 12 as shown by numeral designation 12' (aircraft configured to pitch nose up or nose down).

Figure 2:
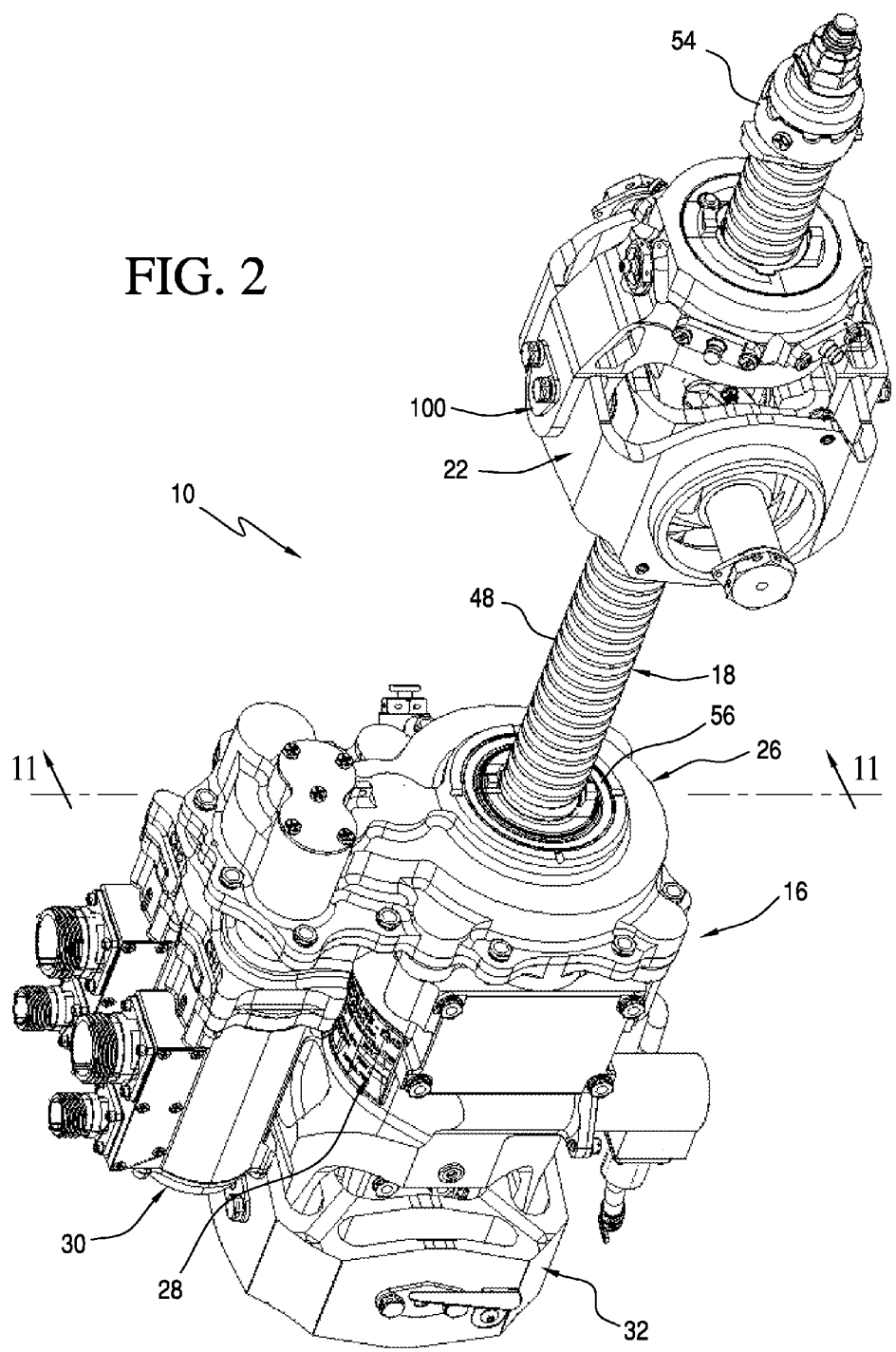
FIG. 2 is a perspective view of the actuator system of FIG. 1.
Figure 11:
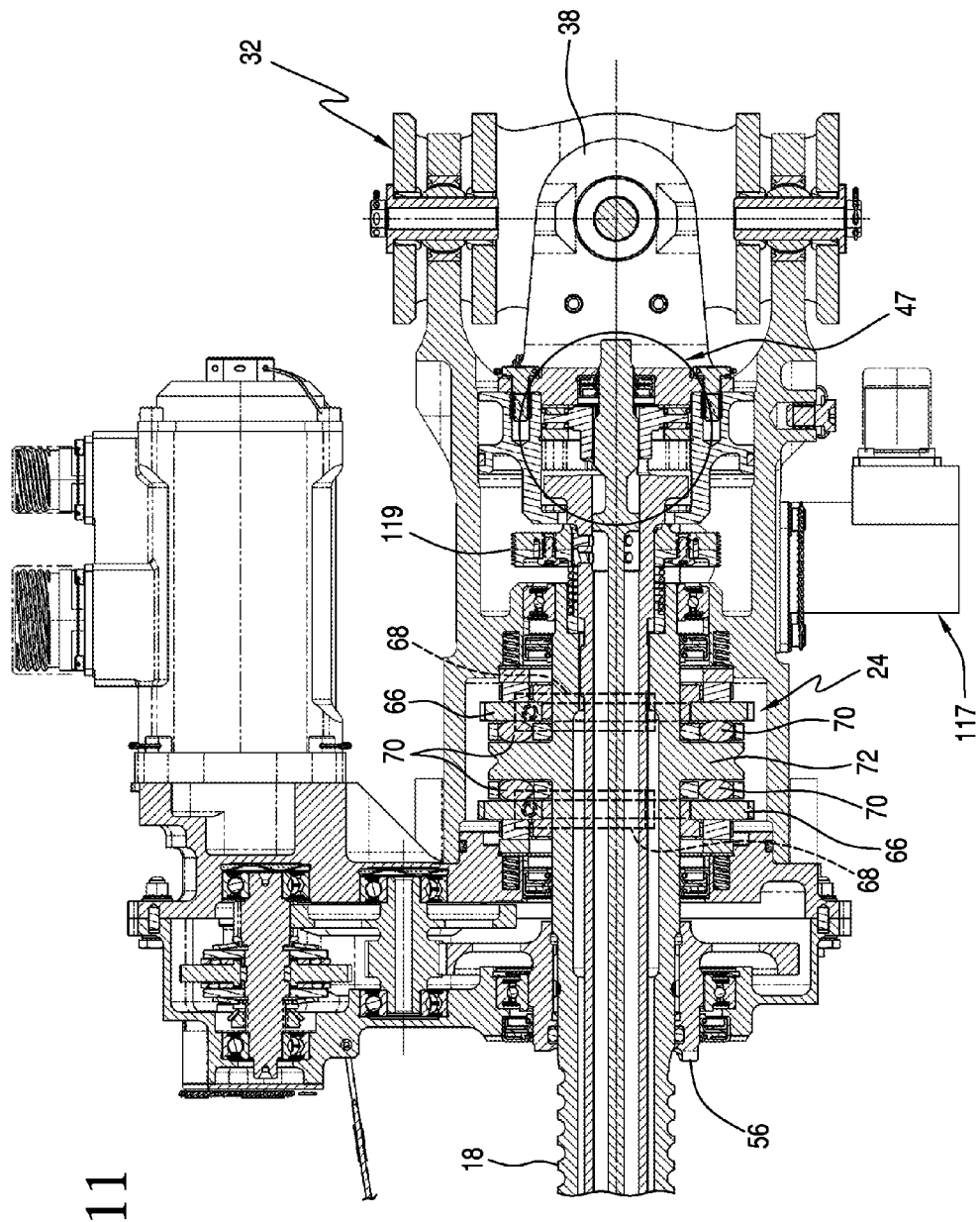
FIG. 11 is a regular section of the stationary actuator assembly showing the irreversibility mechanism, the gear assembly and the tie-rod assembly, taken along line 11-11 of FIG. 2.

Referring now to FIG. 2, the actuator system includes a stationary actuator assembly 16; a ball screw assembly 18; a tie-rod assembly 20 (concentric to ball screw bore and shown in subsequent figures) a translating actuator assembly 22; and, an irreversibility mechanism, designated generally as 24 (shown in FIG. 11, within gear assembly 28).

With references to FIGS. 2-6, the stationary actuator assembly 16 includes a stationary actuator assembly housing 26; a gear assembly 28 (including the irreversibility mechanism 24) supported by the stationary actuator assembly housing 26; a motor assembly 30 (typically a motor brake assembly) operatively associated with the gear assembly 28; and, a stationary primary gimbal assembly 32 mounted to the stationary actuator assembly housing 26. The stationary primary gimbal assembly 32 is securely connected to a primary aircraft structure 14 and a secondary aircraft structure 36.

Figure 3:
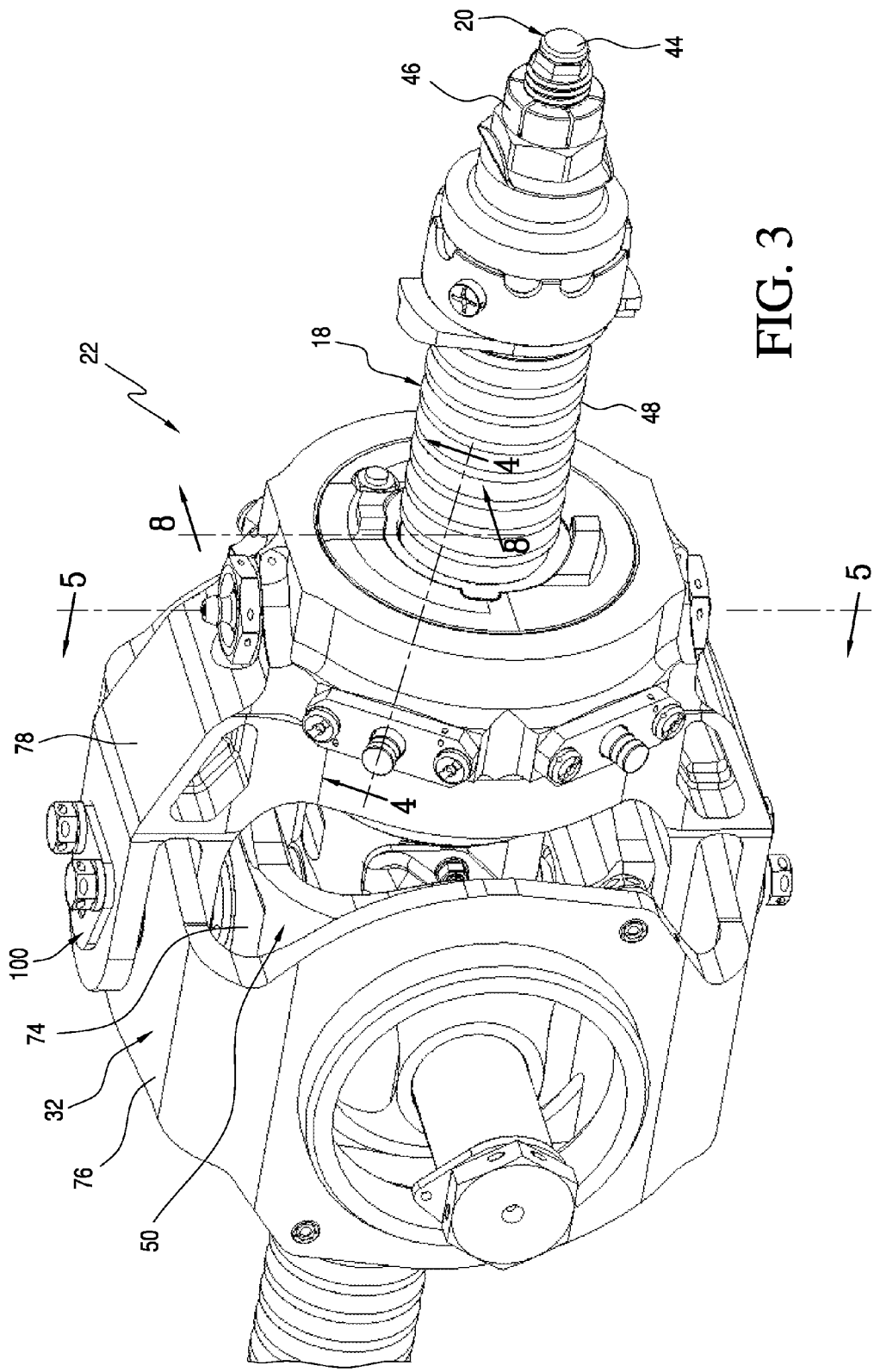
FIG. 3 is an enlarged perspective view of the translating actuator assembly of the actuator system.
Figure 10:
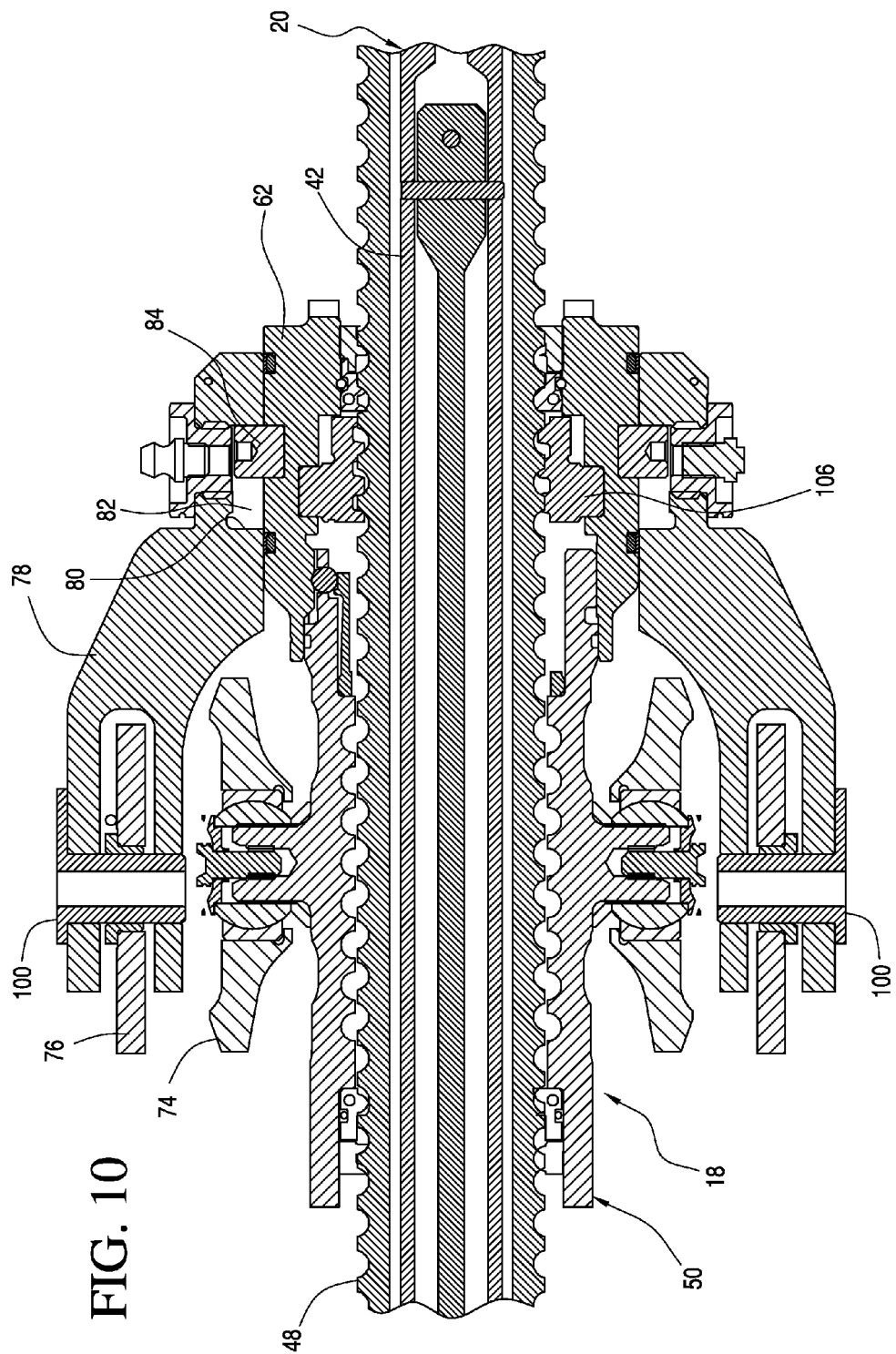
FIG. 10 is a regular section of the translating actuator assembly through the slide lock with lock engaged in compression loading mode.

Referring to FIGS. 3 and 11, the tie-rod assembly 20 is positioned within the ball screw assembly 18. The tie-rod assembly 20 is radially locked to the ball screw assembly 18 at extremities thereof. A secondary clevis 38 is connected to a stationary secondary aircraft structure 36. A secondary locking element is operably connected to the secondary clevis 38. The tie-rod assembly 20 includes a tie rod 42 (see FIG. 10) with a threaded end 44 including a lock nut 46 connected to the tie-rod threaded end 44. A tie-rod secondary load path is defined from the secondary aircraft structure 36 to the secondary clevis 38, to the locking element 47 to the tie-rod 42 and to the lock nut 46.

Figure 4:
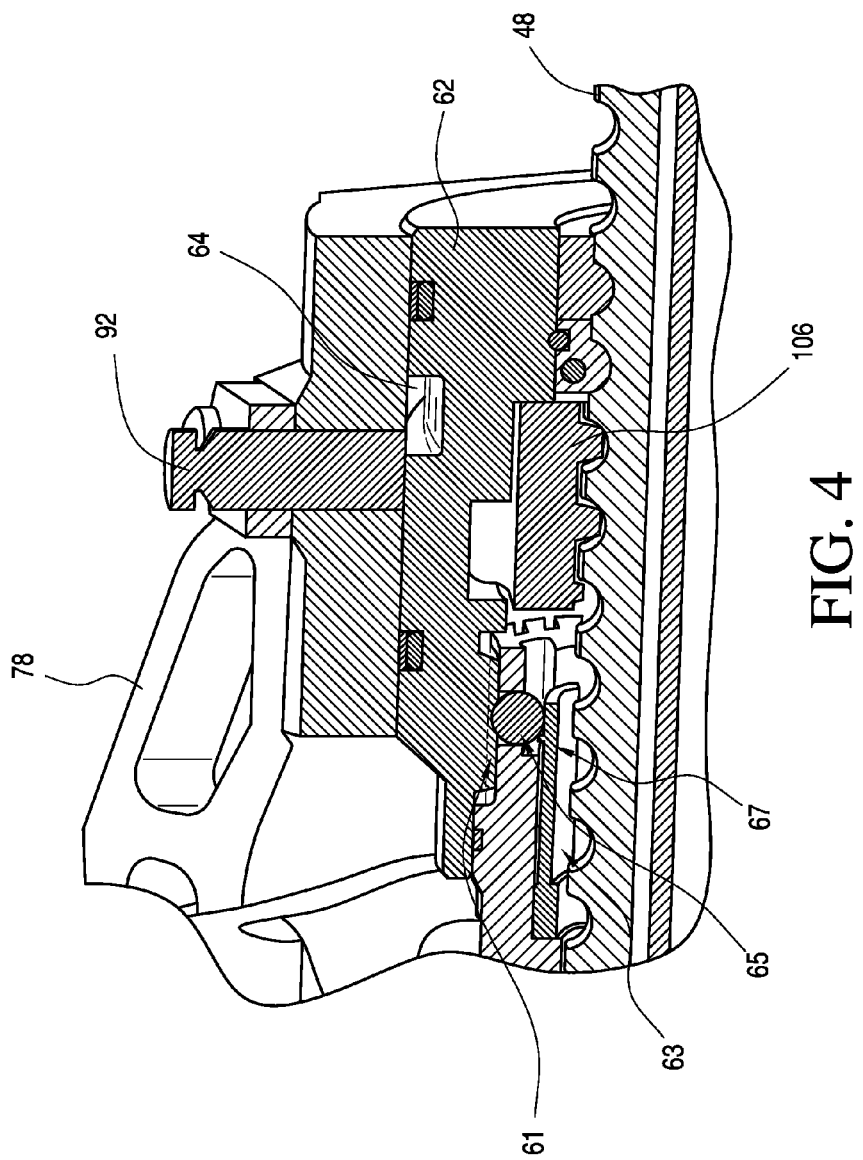
FIG. 4 is a section in perspective of the translating actuator assembly through the slide key while still in intact mode, taken along line 4-4 of FIG. 3.
Figure 6:
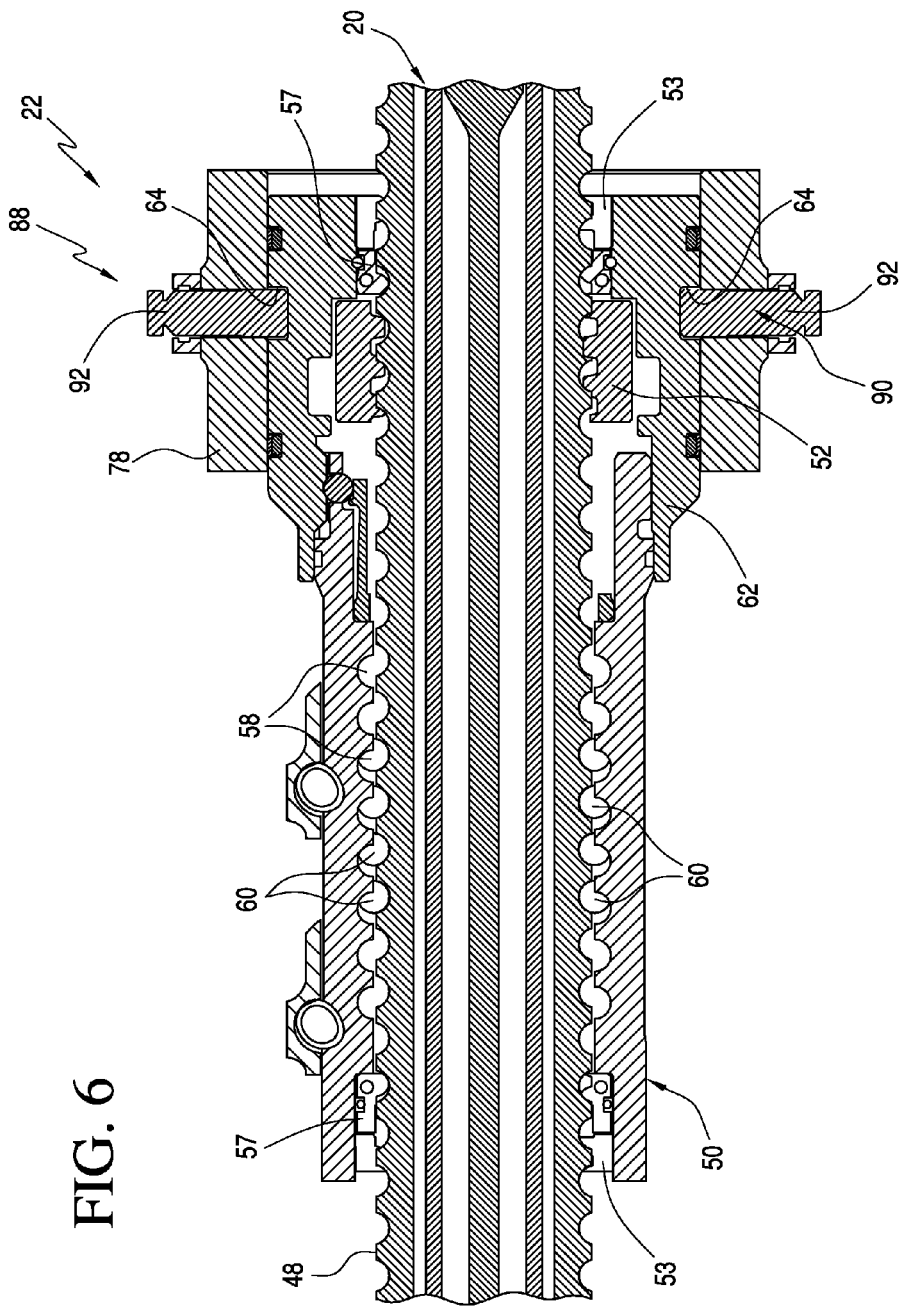
FIG. 6 is a regular section of the translating actuator assembly through the slide key with the slide key engaged in a tension loading mode.

Referring now to FIG. 6, the ball screw assembly 18 includes a ball screw 48; a ball nut assembly 50 translatable along the ball screw 48; wiper 57; ice scraper 53; and, a secondary inverted thread nut housing 62 in a loaded tension mode operatively positioned about the ball nut assembly 50. The ball nut assembly 50 includes a plurality of ball circuits 58, each ball circuit 58 containing a plurality of balls 60. The secondary inverted thread nut housing 62 has plurality of radially and axially spaced slots 64. Referring now to FIG. 2, the ball screw assembly 18 also includes an extend mechanical stop 54 positioned at an end of the ball screw 48 opposite the stationary actuator assembly 16. A retract mechanical stop 56 is at an opposite end of the ball screw 48. The secondary inverted thread nut housing 62 is accurately positioned relative to ball screw 48 and to ball nut assembly 50. Referring now to FIG. 4, this positioning is achieved by means of a splined radial connection 61 and a centering mechanism 63 comprising a centering ring 67 and multiple balls 65.

The ball screw assembly 18 is naturally reversible by design under loading conditions. To make it reversible under compression and tension loading, a bi-directional mechanism is utilized. Referring again to FIG. 11, this bi-directional irreversibility mechanism 24 is operatively connected to the stationary primary gimbal assembly 32 and to the ball screw assembly 18. The irreversibility mechanism 24 includes ratchets 66, pawls 68 and skewed rollers 70 stacked above and below a ball screw flange 72. The secondary inverted thread nut housing 62 will be discussed below in detail.

Figure 5:
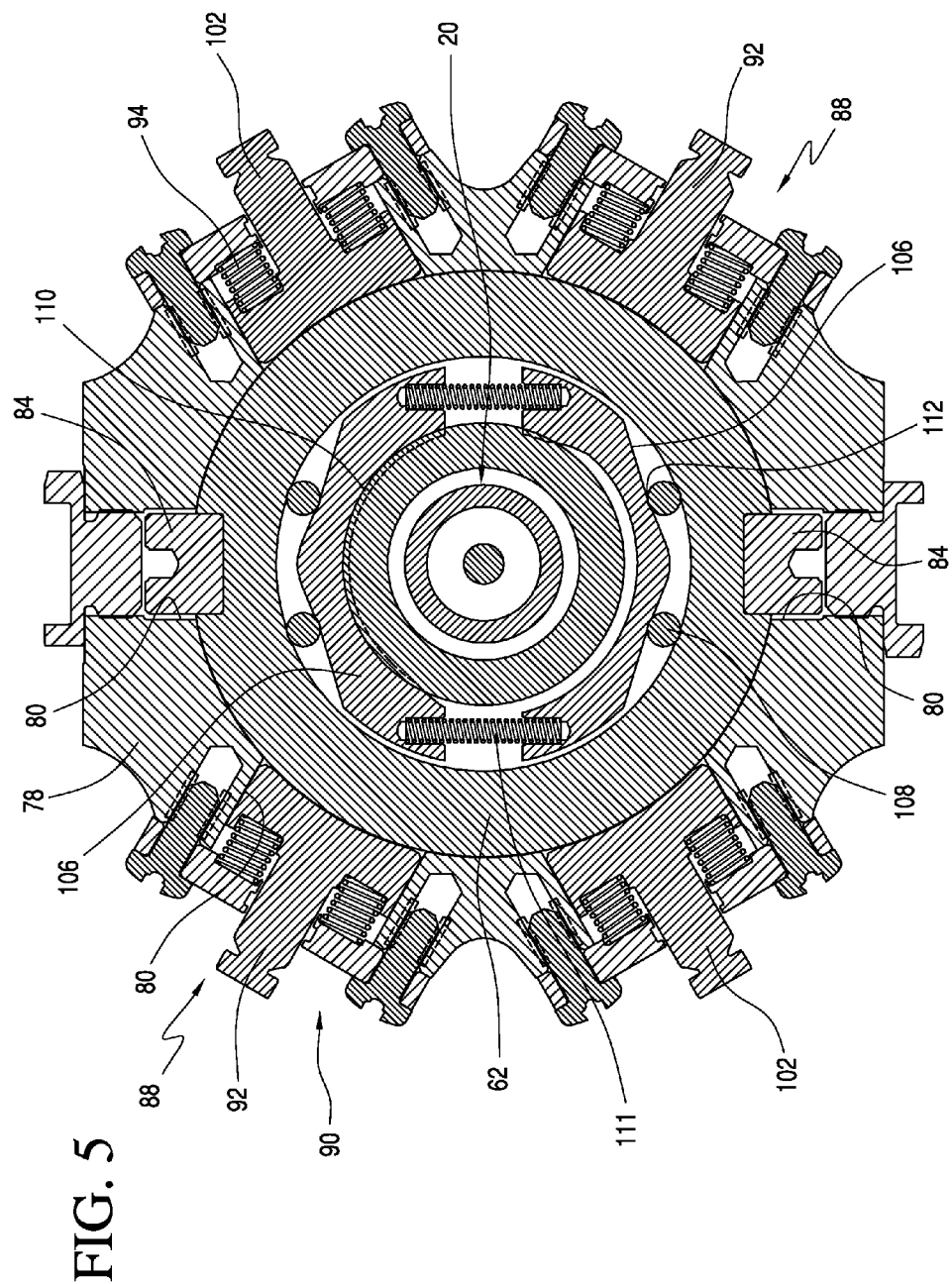
FIG. 5 is a transverse section through the slide keys and slide locks, taken along line 5-5 of FIG. 3.
Figure 9:
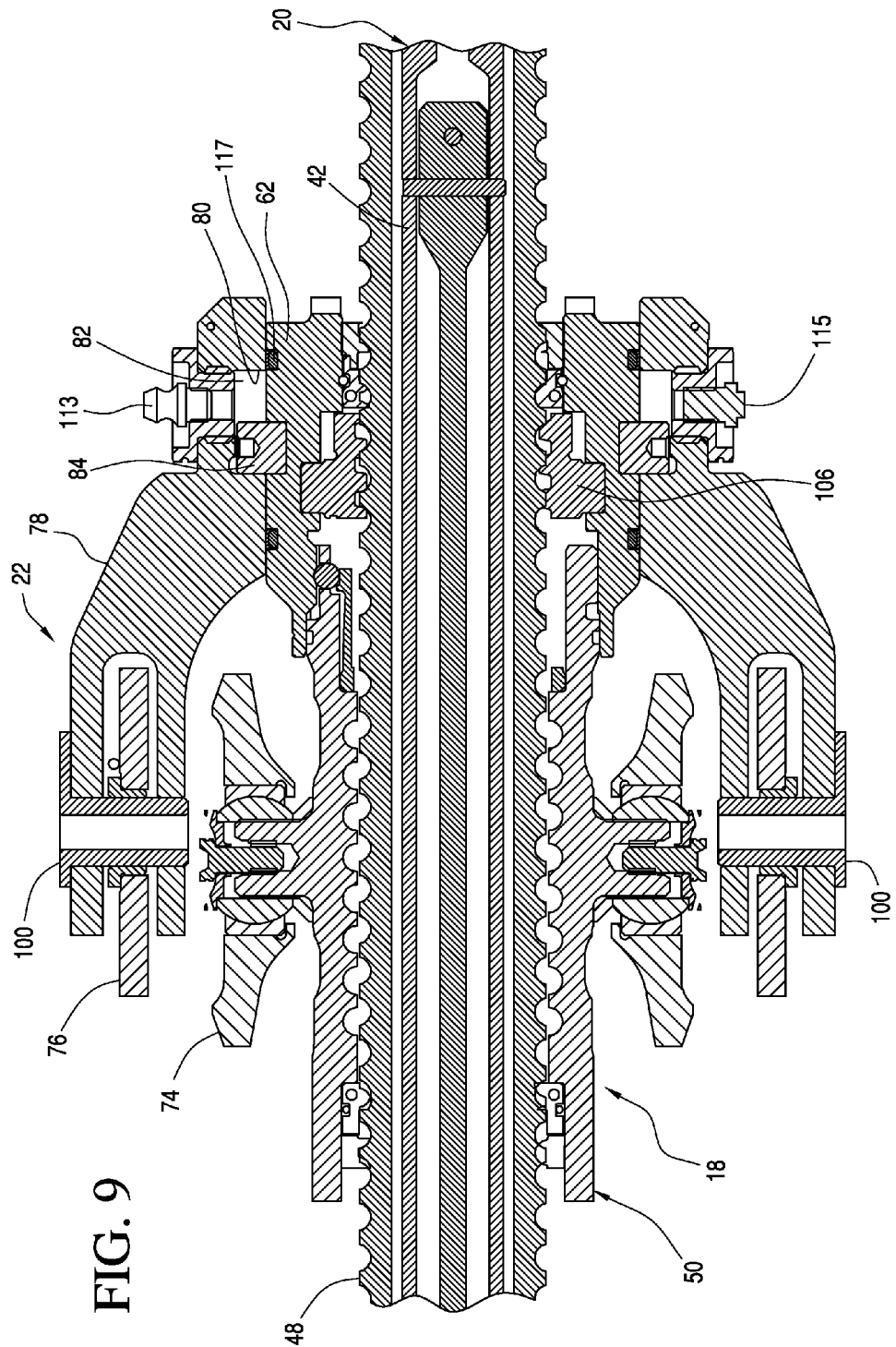
FIG. 9 is a regular section of the translating actuator assembly through the slide lock with lock engaged in tension loading mode.

Referring best to FIG. 9, the translating actuator assembly 22 includes a translating primary gimbal assembly 74 operatively connected to the ball screw assembly 18, defining a translating portion of the primary load path. A translating secondary gimbal assembly 76 is positioned about the translating primary gimbal assembly 74 and securely connected to the control surface 12. Referring best to FIGS. 5 and 9, a translating clevis assembly 78 is operatively connected to the secondary inverted thread nut housing (SITNH) 62 and to the translating secondary gimbal assembly 76. The translating clevis assembly 78 contains a plurality of grooves 80 and associated openings 82. At least two stationary major keys 84 are mounted between the translating clevis assembly 78 and the secondary inverted thread nut housing (SITNH) 62.

Referring to FIG. 6, the translating actuator assembly includes an axial and radial tension lock assembly 88 that includes at least one tension slide key assembly 90 housed within the translating clevis assembly 78. Each tension slide key assembly 90 includes a tension slide key 92; and, at least one spring 94 mounted on the tension slide key 92 and operably connected to the translating clevis assembly 78, wherein during intact primary load path operation up to the structural integrity load the tension slide key 92 contacts an outer surface of the SITNH 62 in stand-by mode unaffected and unengaged by relative deflections between the primary load path and the secondary load path. During failed primary load path operation the tension slide key 92 drops and engages in an associated slot 64 in the SITNH 62 minimizing axial play.

Figure 7:
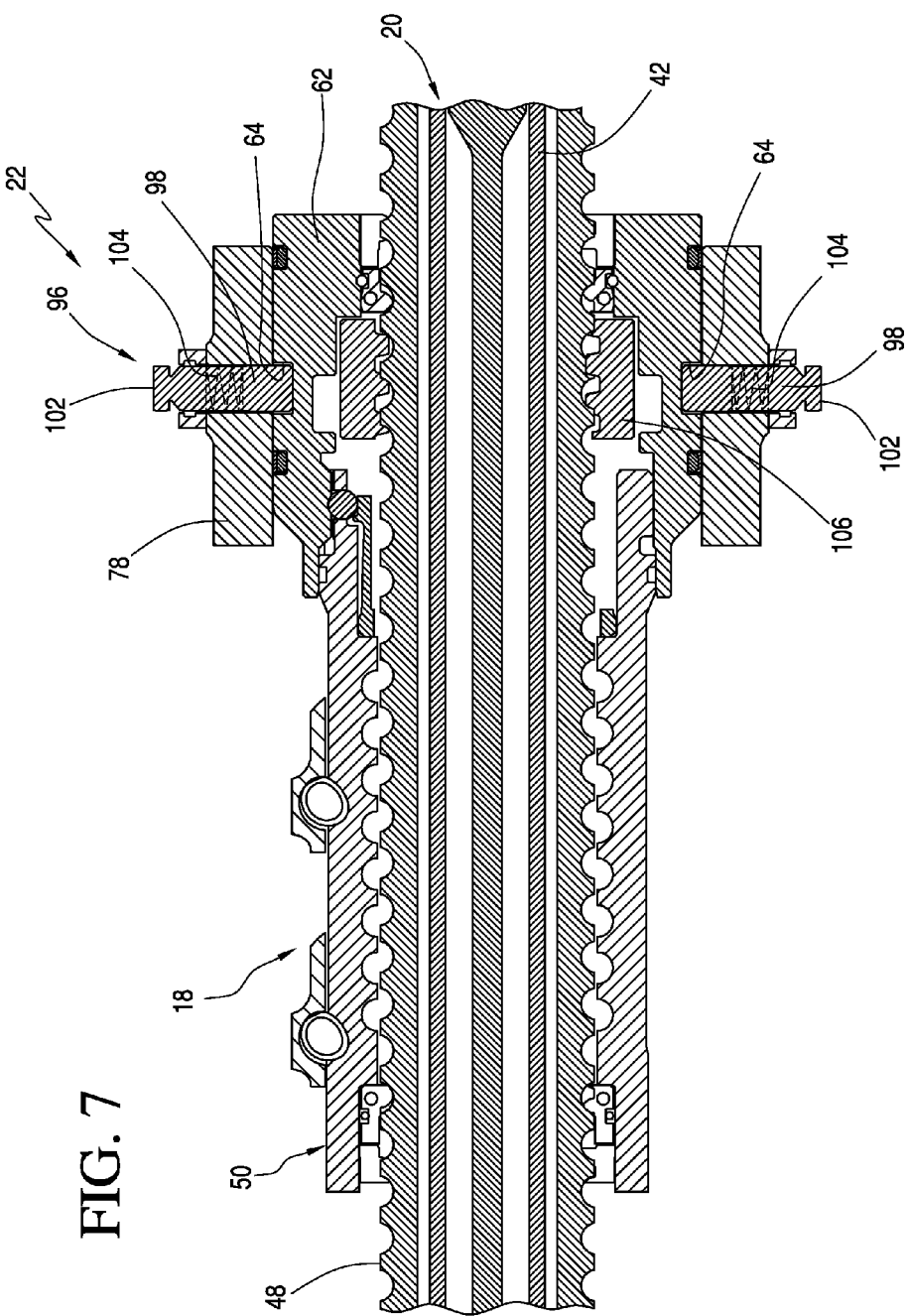
FIG. 7 is a regular section of the translating actuator assembly through the slide key with the slide key engaged in a compression loading mode.
Figure 8:
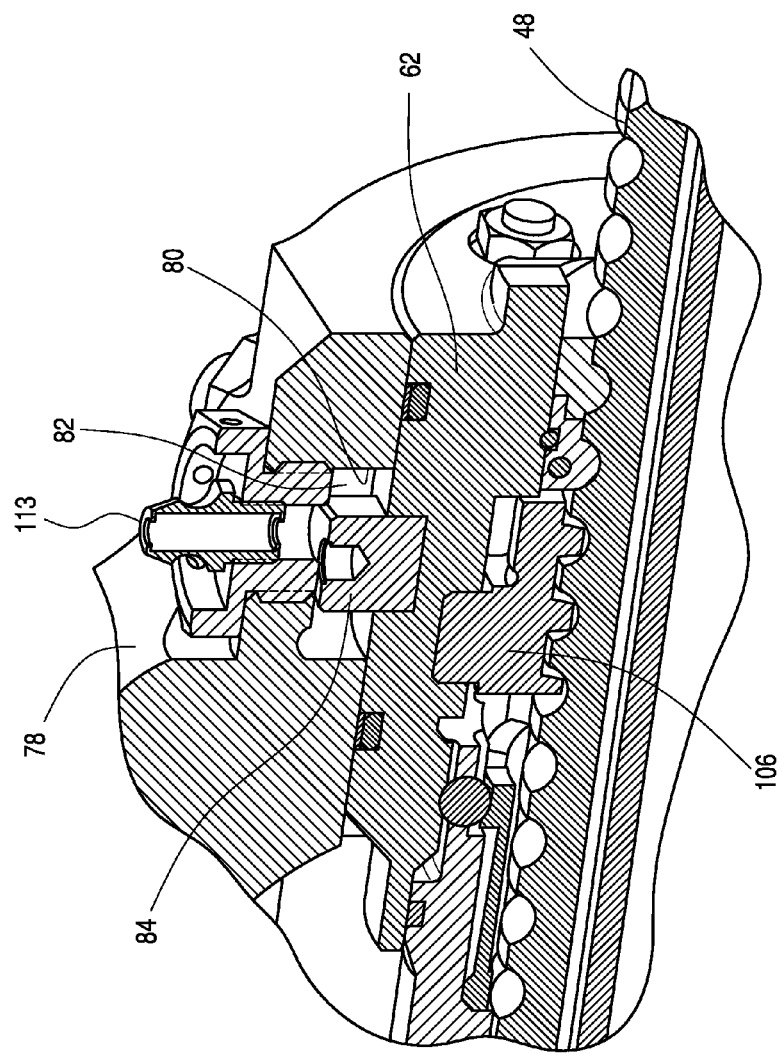
FIG. 8 is a section in perspective of the translating actuator assembly through the slide lock while still in intact mode with the major key centered (lock not engaged), taken along line 8-8 of FIG. 3.

Referring to FIG. 7, the translating actuator assembly 22 includes an axial and radial compression lock assembly 96. The axial and radial compression lock assembly 96 includes at least one compression slide key assembly 98 housed within the translating clevis assembly 78. Each compression slide key assembly 98 includes a compression slide key 102; and, at least one spring 104 mounted on the compression slide key 102 and operably connected to the translating clevis assembly 78. During intact primary load path operation up to the structural integrity load the compression slide key 102 contacts an outer surface of the SITNH 62 in stand-by mode unaffected and unengaged by relative deflections between the primary load path and the secondary load path. During failed primary load path operation the compression slide key 102 drops and engages in an associated slot 64 in the SITNH 62 minimizing axial play.

Referring to FIG. 3, at least two retaining elements 100 are securely attached to the translating clevis assembly 78 for providing the operative connection between the translating clevis assembly 78 and the translating secondary gimbal assembly 76.

A translating portion of the primary load path in compression and in tension directions is defined by the load from the ball screw 48 to the ball nut assembly 50 to the translating primary gimbal assembly 74 to the control surface 12; wherein only the primary load path is loaded when intact.

A translating portion of the secondary load path in compression direction is defined by the load from the ball screw 48 to the SITNH 62 to the stationary major keys 84 the compression slide key 102 and to the translating clevis assembly 78 to the retaining elements 100 to the translating secondary gimbal assembly 76 to the control surface 12. The secondary load path is unloaded, in stand-by, when the primary load path is intact in compression.

A translating portion of the secondary load path in the tension direction is defined by the load from the ball screw 48 to the SITNH 62 to the tension slide key 92 and the stationary major keys 84 to the translating clevis assembly 78 to the retaining elements 100 to the translating secondary gimbal assembly 76 to the control surface 12. The secondary load path is unloaded, in stand-by, when the primary load path is intact in tension.

Referring to FIG. 5, the secondary inverted thread nut housing 62 includes a split inverted thread nut 106; and, a set of four rollers 108. The split inverted thread nut 106 is divided in two halves, the split inverted nut containing multiple inverted threads 110 and are separated by multiple springs 111. The split inverted nut threads 110 are adapted and arranged for not contacting the ball screw 48 under a primary load path intact condition up to structural limit loading condition. The set of four rollers 108 is positioned between the split inverted nut halves 106 and the SITNH 62 wherein the split inverted thread nut 106 contains four shallow "V" grooves 112 designed to wedge the split inverted thread nut halves 106 against the ball screw 48 when the SITNH 62 is loaded when the primary load path is failed. The inverted thread nut 106 locks in a clockwise (CW) direction and counter clockwise (CCW) direction. The inverted thread nut 106 locks and inhibits ball screw rotation under minimal tension load and under minimal compression axial load.

Referring to FIG. 9, the translating clevis assembly 78 is equipped with grease zerk 113, grease relief valve 115 and multiple glide rings 117 assuring the inner cavity (including grooves 80) is greased.

Referring to FIGS. 6 and 7, the slide keys 92 and 102 comprise a circular groove in its tail. This groove can be held to allow actuation (pull and release) of the slide keys 92, 102 to exercise the springs 94. Additionally, this circular groove will enable pulling and release of the slide keys 92,102 from locked and engaged positions. Referring to FIG. 11, a position sensor 117 is operatively connected to the stationary actuator assembly 16 by means of gearing to a worm gear 119.

Although the invention has been described with respect to utilization with a horizontal stabilizer it may be implemented with a variety of control surfaces such as an aileron, a wing trailing edge flap, a wing leading edge slat, an elevator, an Elevon (control surface performing roles of elevator and aileron), a Flaperon (a control surface performing roles of wing flap trailing edge and aileron), or wing (for variable wing sweep aircraft).

Although the present invention has been described with respect to utilization with a ball screw assembly it can be implemented with a variety of linear actuator assemblies such as a roller screw assembly or jack screw assembly.

Although the major key, tension slide key, compression slide key and slot have been illustrated as having square cross-sections it is understood they can have other shapes such as rectangular shapes, cylindrical, or circular.

Other embodiments and configurations may be devised without departing from the spirit of the invention and the scope of the appended claims.

The invention claimed is:

1. An actuator system for an aircraft having a primary aircraft structure, a secondary aircraft structure and a control surface positionable relative to said primary and secondary aircraft structures, the actuator system defining a dual load path between the primary and secondary aircraft structure and the control surface, the dual load path comprising a primary load path and a secondary load path, said actuator system, comprising:
 a) a stationary actuator assembly, comprising:
  i. a stationary actuator assembly housing;
  ii. a gear assembly supported by said stationary actuator assembly housing;
  iii. at least one motor assembly operatively associated with said gear assembly; and,
  iv. a stationary primary gimbal assembly mounted to said stationary actuator assembly housing, said stationary primary gimbal assembly being securely connected to a primary aircraft structure;
 b) a ball screw assembly operatively connected to said gear assembly, said ball screw assembly, comprising:
  i. a ball screw;
  ii. a ball nut assembly translatable along said ball screw; said ball nut assembly comprising a plurality of ball circuits, each ball circuit containing a plurality of balls;
  iii. a secondary inverted thread nut housing in an unloaded standby mode operatively positioned about said ball nut assembly, said secondary inverted thread nut housing having a plurality of radially and axially spaced slots;
  iv. an extend mechanical stop positioned at an end of said ball screw opposite said stationary actuator assembly; and,
  v. a retract mechanical stop at an opposite end of said ball screw;
 c) a tie-rod assembly positioned within said ball screw assembly, said tie-rod assembly being radially locked to said ball screw assembly at extremities thereof, said tie-rod assembly comprising:
  i. a secondary clevis connected to said secondary aircraft structure;
  ii. a secondary locking element operably connected to said secondary clevis; and,
  iii. a tie-rod comprising a threaded end including a lock nut, said lock nut connected to said tie-rod threaded end;
  wherein a tie-rod secondary load path is defined from said secondary aircraft structure to said secondary clevis, to said locking element to said tie-rod and to said locking nut;
 d) a translating actuator assembly, comprising:
  i. a translating primary gimbal assembly operatively connected to said ball screw assembly;
  ii. a translating secondary gimbal assembly positioned about said translating primary gimbal assembly and securely connected to the control surface;
  iii. a translating clevis assembly operatively connected to said secondary inverted thread nut housing and to said translating secondary gimbal assembly, said translating clevis assembly containing a plurality of grooves and associated openings;
  iv. at least two stationary major keys mounted between said translating clevis assembly and said secondary inverted thread nut housing (SITNH);
  v. an axial and radial tension lock assembly comprising:
   at least one tension slide key assembly housed within said translating clevis assembly, each tension slide key assembly, comprising:
    a. a tension slide key; and,
    b. at least one spring mounted on said tension slide key and operably connected to said translating clevis assembly, wherein during intact primary load path operation up to a structural integrity load, said tension slide key contacts an outer surface of said SITNH in stand-by mode unaffected and unengaged by relative deflections between said primary load path and said secondary load path; and, during failed primary load path operation said tension slide key drops and engages in an associated slot in said SITNH minimizing axial play;
  vi. an axial and radial compression lock assembly comprising:
   at least one compression slide key assembly housed within the translating clevis assembly; each compression slide key assembly, comprising:
    a. a compression slide key; and, b. at least one spring mounted on said compression slide key and operably connected to said translating clevis assembly, wherein during intact primary load path operation up to a structural integrity load, said compression slide key contacts an outer surface of said SITNH in stand-by mode unaffected and unengaged by relative deflections between said primary load path and said secondary load path; and, during failed primary load path operation said compression slide key drops and engages in an associated slot in said SITNH minimizing axial play;

vii. at least two retaining elements securely attached to said translating clevis assembly for providing said operative connection between said translating clevis assembly and said translating secondary gimbal assembly, wherein, a translating portion of said primary load path in compression and in tension directions is defined by the load from said ball screw to said ball nut assembly to said translating primary gimbal assembly to said control surface; wherein only said primary load path is loaded when intact;

a translating portion of said secondary load path in compression direction is defined by the load from said ball screw to said SITNH to said compression slide key and said stationary major keys to said translating clevis assembly to said retaining elements to said translating secondary gimbal assembly to said control surface; wherein said secondary load path is unloaded, in stand-by, when said primary load path is intact in compression; and, a translating portion of said secondary load path in tension direction is defined by the load from said ball screw to said SITNH to said tension slide key and said stationary major keys to said translating clevis assembly to said retaining elements to said translating secondary gimbal assembly to said control surface, wherein said secondary load path is unloaded, in stand-by, when said primary load path is intact in tension.

2. The actuator system of claim 1, wherein said control surface comprises a horizontal stabilizer.

3. The actuator system of claim 1, wherein said control surface comprises a horizontal stabilizer, said system further comprising an irreversibility mechanism operatively connected to said stationary primary gimbal assembly and to said ball screw assembly.

4. The actuator system of claim 1, wherein said control surface comprises a horizontal stabilizer, said system further comprising:
a) an irreversibility mechanism operatively connected to said stationary primary gimbal assembly and to said ball screw assembly;
b) at least one position sensor operatively connected to said stationary actuator assembly.

5. The actuator system of claim 1, wherein each
a) said major key has a square cross-section;
b) said tension slide key has a square cross-section;
c) said compression slide key has a square cross-section; and,
d) said slot has a square cross-section.

6. The actuator system of claim 1, wherein each
a) said major key is cylindrical;
b) said tension slide key is cylindrical;
c) said compression slide key geometry is cylindrical; and,
d) said slot cross section is circular.

7. The actuator system of claim 1, wherein each
a) said major key has a rectangular cross-section;
b) said tension key has a rectangular cross-section;
c) said radial slot has a rectangular cross-section; and,
d) said slot cross section geometry is rectangular.

8. The actuator system of claim 1, wherein said secondary inverted thread nut housing, comprises:
a) a split inverted thread nut divided in two halves, said split inverted nut containing multiple inverted threads, said split inverted thread nut threads adapted and arranged for not contacting said ball screw under a primary load path intact condition; and,
b) a set of four rollers positioned between said split inverted nut halves and said SITNH wherein said split inverted thread nut contains four shallow "V" grooves designed to wedge said split inverted thread nut halves against said ball screw when said SITNH is loaded when said primary load path is intact, wherein
i. said inverted thread nut locks in a CW direction and CCW direction; and;
ii. said inverted thread nut locks and inhibits ball screw rotation under minimal tension load and under minimal compression axial load.

9. A method for minimizing axial backlash in a dual load path fail-safe actuation system, comprising the steps of:
providing an actuator system for an aircraft having a primary aircraft structure, a secondary aircraft structure and a control surface positionable relative to said primary and secondary aircraft structures, the actuator system defining a dual load path between the primary and secondary aircraft structure and the control surface, the dual load path comprising a primary load path and a secondary load path, said actuator system, comprising:
a) a stationary actuator assembly, comprising:
i. a stationary actuator assembly housing;
ii. a gear assembly supported by said stationary actuator assembly housing;
iii. at least one motor assembly operatively associated with said gear assembly; and,
iv. a stationary primary gimbal assembly mounted to said stationary actuator assembly housing, said stationary primary gimbal assembly being securely connected to a primary aircraft structure;
b) a ball screw assembly operatively connected to said gear assembly, said ball screw assembly, comprising:
i. a ball screw;
ii. a ball nut assembly translatable along said ball screw; said ball nut assembly comprising a plurality of ball circuits, each ball circuit containing a plurality of balls;
iii. a secondary inverted thread nut housing in an unloaded standby mode operatively positioned about said ball nut assembly, said secondary inverted thread nut housing having a plurality of radially and axially spaced slots;
iv. an extend mechanical stop positioned at an end of said ball screw opposite said stationary actuator assembly; and,
v. a retract mechanical stop at an opposite end of said ball screw;
c) a tie-rod assembly positioned within said ball screw assembly, said tie-rod assembly being radially locked to said ball screw assembly at extremities thereof, said tie-rod assembly comprising:
i. a secondary clevis connected to said secondary aircraft structure;

ii. a secondary locking element operably connected to said secondary clevis; and,
iii. a tie-rod comprising a threaded end including a lock nut, said lock nut connected to said tie-rod threaded end;
wherein a tie-rod secondary load path is defined from said secondary aircraft structure to said secondary clevis, to said locking element to said tie-rod and to said locking nut;

d) a translating actuator assembly, comprising:
  i. a translating primary gimbal assembly operatively connected to said ball screw assembly;
  ii. a translating secondary gimbal assembly positioned about said translating primary gimbal assembly and securely connected to the control surface;
  iii. a translating clevis assembly operatively connected to said secondary inverted thread nut housing and to said translating secondary gimbal assembly, said translating clevis assembly containing a plurality of grooves and associated openings;
  iv. at least two stationary major keys mounted between said translating clevis assembly and said secondary inverted thread nut housing (SITNH);
  v. an axial and radial tension lock assembly comprising:
    at least one tension slide key assembly housed within said translating clevis assembly, each tension slide key assembly, comprising:
      a. a tension slide key; and,
      b. at least one spring mounted on said tension slide key and operably connected to said translating clevis assembly, wherein during intact primary load path operation up to a structural integrity load, said tension slide key contacts an outer surface of said SITNH in stand-by mode unaffected and unengaged by relative deflections between said primary load path and said secondary load path; and, during failed primary load path operation said tension slide key drops and engages in an associated slot in said SITNH minimizing axial play;
  vi. an axial and radial compression lock assembly comprising:
    at least one compression slide key assembly housed within the translating clevis assembly; each compression slide key assembly, comprising:
      a. a compression slide key; and,
      b. at least one spring mounted on said compression slide key and operably connected to said translating clevis assembly, wherein during intact primary load path operation up to a structural integrity load, said compression slide key contacts an outer surface of said SITNH in stand-by mode unaffected and unengaged by relative deflections between said primary load path and said secondary load path; and, during failed primary load path operation said compression slide key drops and engages in an associated slot in said SITNH minimizing axial play;
  vii. at least two retaining elements securely attached to said translating clevis assembly for providing said operative connection between said translating clevis assembly and said translating secondary gimbal assembly, wherein,
    a translating portion of said primary load path in compression and in tension directions is defined by the load from said ball screw to said ball nut assembly to said translating primary gimbal assembly to said control surface; wherein only said primary load path is loaded when intact;
    a translating portion of said secondary load path in compression direction is defined by the load from said ball screw to said SITNH to said compression slide key and said stationary major keys to said translating clevis assembly to said retaining elements to said translating secondary gimbal assembly to said control surface; wherein said secondary load path is unloaded, in stand-by, when said primary load path is intact in compression; and,
    a translating portion of said secondary load path in tension direction is defined by the load from said ball screw to said SITNH to said tension slide key and said stationary major keys to said translating clevis assembly to said retaining elements to said translating secondary gimbal assembly to said control surface, wherein said secondary load path is unloaded, in stand-by, when said primary load path is intact in tension; and,
  utilizing said actuator system during operation of an aircraft.

* * * * *